(12) United States Patent
Qi et al.

(10) Patent No.: US 9,426,199 B2
(45) Date of Patent: *Aug. 23, 2016

(54) METHOD, APPARATUS, AND SYSTEM FOR NOTIFYING REAL-TIME STREAMING PROTOCOL EVENTS

(71) Applicant: Huawei Technologies Co., Ltd., Shenzhen (CN)

(72) Inventors: Baojian Qi, Shenzhen (CN); Xiaosong Lei, Shenzhen (CN); Peng Wang, Shenzhen (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 325 days.

This patent is subject to a terminal disclaimer.

(21) Appl. No.: 14/143,978

(22) Filed: Dec. 30, 2013

(65) Prior Publication Data

US 2014/0115048 A1  Apr. 24, 2014

Related U.S. Application Data

(63) Continuation of application No. 12/690,586, filed on Jan. 20, 2010, now Pat. No. 8,667,124, which is a continuation of application No. PCT/CN2008/071690, filed on Jul. 18, 2008.

(30) Foreign Application Priority Data

Jul. 20, 2007  (CN) .......................... 2007 1 0130108

(51) Int. Cl.
*G06F 15/173*    (2006.01)
*H04L 29/06*    (2006.01)
(Continued)

(52) U.S. Cl.
CPC .............. *H04L 65/608* (2013.01); *H04L 43/08* (2013.01); *H04L 65/1083* (2013.01);
(Continued)

(58) Field of Classification Search
CPC ....................................................... H04L 43/08
USPC .................................................. 709/224, 231
See application file for complete search history.

(56) References Cited

U.S. PATENT DOCUMENTS 6,910,078 B1  6/2005  Raman et al.
7,272,651 B1  9/2007  Bolding et al.
(Continued)

FOREIGN PATENT DOCUMENTS

CN  1559120 A  12/2004
JP  2004-537187 A  12/2004
(Continued)

OTHER PUBLICATIONS

Schulzrinne et al., "Real Time Streaming Protocol 2.0 (RTSP)" MMUSIC Working Group, Jun. 25, 2007, 280 pages.
(Continued)

*Primary Examiner* — Jason Recek
(74) *Attorney, Agent, or Firm* — Brinks Gilson & Lione (57) ABSTRACT

A method for notifying a Real-Time Streaming Protocol (RTSP) event includes: monitoring an event state; and sending a notification indicative of a change of the event state to an event state receiving device if detecting the change of the event state. A computer program and a computer-readable storage medium are provided to enable a computer to perform the steps of the method for notifying an RTSP event. An apparatus for notifying an RTSP event includes: an event state monitoring unit, adapted to monitor an event state; and a message sending unit, adapted to send a notification indicative of a change of the event state when the event state monitoring unit detects the change of the event state. A system for notifying an RTSP event includes the RTSP event notifying apparatus.

18 Claims, 5 Drawing Sheets

(51) Int. Cl.
  *H04L 12/26* (2006.01)
  *H04N 21/6437* (2011.01)
  *H04N 21/2387* (2011.01)
  *H04N 21/6336* (2011.01)
  *H04N 21/658* (2011.01)

(52) U.S. Cl.
  CPC .......... *H04L 65/4092* (2013.01); *H04L 65/80* (2013.01); *H04N 21/2387* (2013.01); *H04N 21/6336* (2013.01); *H04N 21/6437* (2013.01); *H04N 21/6581* (2013.01)

(56) References Cited

U.S. PATENT DOCUMENTS

| | | |
|---|---|---|
| 7,509,390 B1 | 3/2009 | Raman et al. |
| 2002/0152284 A1 | 10/2002 | Cambray et al. |
| 2004/0139088 A1 | 7/2004 | Mandato et al. |
| 2006/0155851 A1 | 7/2006 | Ma et al. |
| 2006/0168208 A1 | 7/2006 | Nagami |
| 2006/0173997 A1 | 8/2006 | Tullberg et al. |
| 2006/0293051 A1 | 12/2006 | Ewert et al. |
| 2008/0201467 A1 | 8/2008 | Delany et al. |
| 2008/0215704 A1 | 9/2008 | Curcio et al. |
| 2010/0121976 A1* | 5/2010 | Qi ................ H04N 21/6437 709/231 |
| 2010/0138531 A1 | 6/2010 | Kashyap |

FOREIGN PATENT DOCUMENTS

| | | |
|---|---|---|
| JP | 2007-504736 A | 3/2007 |
| JP | 2007-088960 | 4/2007 |
| WO | WO 2005/088929 A1 | 9/2005 |
| WO | WO 2006/007929 A1 | 1/2006 |

OTHER PUBLICATIONS

Masahiro Fukuda, "The Current State and Future of Digital Broadcasting Technology" Image Lab, vol. 14, No. 10, Japan Industrial Publishing Co., Oct. 1, 2003, 6 pages (no English translation available).

* cited by examiner

METHOD, APPARATUS, AND SYSTEM FOR NOTIFYING REAL-TIME STREAMING PROTOCOL EVENTS

This application is a continuation of U.S. patent application Ser. No. 12/690,586, filed on Jan. 20, 2010, which is a continuation of International Application No. PCT/CN2008/071690, filed on Jul. 18, 2008. The International Application claims priority to Chinese Patent Application No. 200710130108.2, filed on Jul. 20, 2007. The afore-mentioned patent applications are hereby incorporated by reference in their entireties.

FIELD OF THE TECHNOLOGY

The present disclosure relates to communication technologies, and in particular, to a method, apparatus, and system for notifying Real-Time Streaming Protocol (RTSP) events.

BACKGROUND

RTSP is an application-level protocol primarily for controlling transmission of real-time data. It provides an extensible framework for controlling and playing real-time data such as video data or audio data on demand. RTSP is designed to control multiple data transmission sessions, to provide a method for selecting a transmission channel, and to provide a method for selecting a transmission mechanism based on a Real Time Transport Protocol (RTP).

Figure 1:
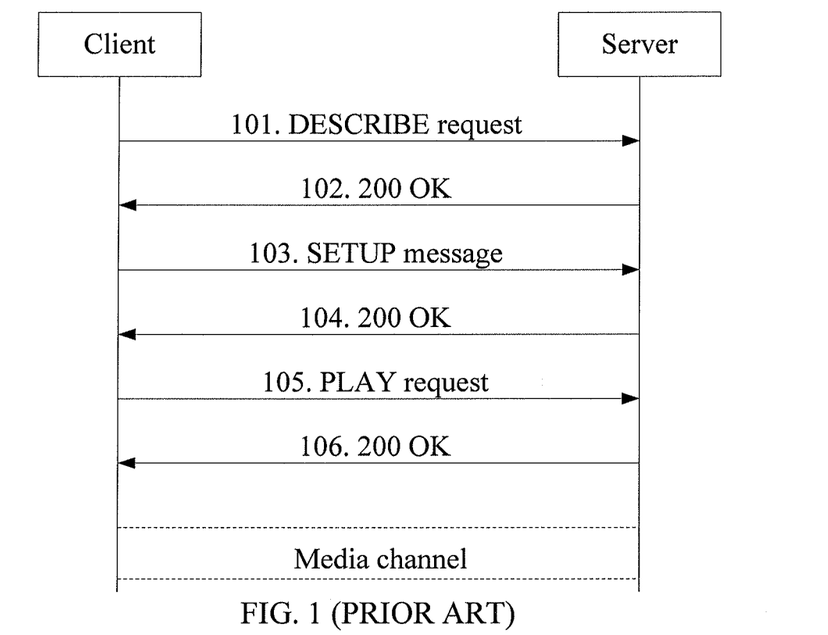
FIG. 1 is a flowchart of RTSP signaling interactions in the prior art.

As shown in FIG. 1, an RTSP signaling interaction process in the prior art includes:

Step 101: A client sends a DESCRIBE request to the server, requesting presentation description from RTSP. The request carries the description of the media content and the identifier of each media stream. For example, the media content description includes the number of media streams in a media content, and the details about each media stream such as the media type and the coding/decoding type. The client is an RTSP client, and the server is an RTSP server.

Step 102: The server returns a success response (200 OK) to the client and describes the requested information.

The process of the client obtaining the resource description information is a completely independent process of obtaining information before the client requests media from the server and performs control operations for the media. The information may also be obtained by other means such as HTTP and email.

Step 103: The client sends a SETUP message to the server, requesting to set up a media stream. The message carries a media stream identifier that specifies the media stream to be set up, for example, an audio media stream or a video media stream in a multimedia content.

Step 104: The server returns a success response (200 OK) to the client, and the setup of the media stream is completed.

Step 103 and step 104 are a complete process of setting up a media stream. After completion of setting up the media stream, the server does not start playing the media or transmitting the media stream. To start the play, the client needs to send a PLAY message to the server explicitly, requesting to play the media. The multimedia content generally includes multiple media streams. To play multiple media, the client needs to set up multiple media streams with the server. In RTSP, each media stream desired by the client needs to be set up between the client and the server one by one; that is, the interaction process in step 103 or step 104 occurs repeatedly.

Step 105: The client sends a PLAY message to the server, requesting to start playing the media. The message carries a media stream identifier that specifies an established media stream to be played, or carries a presentation identifier that specifies play of all media streams in an established presentation package.

Step 106: The server returns a success response (200 OK) to the client in response to step 105, indicating start of playing the media stream.

The media stream is transmitted through a media channel.

Step 105 and step 106 constitute a process of setting up a media channel. After the interaction in step 105 and step 106 is completed, the client may receive the media stream from the server through the media channel, decode the received media stream and display the media stream to the user through a user terminal interface, or store the media stream locally.

In the media stream applications, the client requests the server to execute a request command, if a normal or abnormal event occurs when the server executes the command, the server needs to notify the event or the latest condition of executing the request to the client in certain mode. In the RTSP application, however, the server begins playing the requested media to the client after receiving a PLAY message, and returns a success response (200 OK) to the client at the same time. Afterward, if an exceptional event (for example, an exception of the server in reading the media file) in the process of playing the media, or a non-exceptional event (for example, in the real-time streaming application, the user requests fast-forward but the play progress has reached the program of the current time) that needs to be handled by the client occurs, because the prior RTSP protocol provides no relevant mechanism or technology, the server is unable to notify the exception or the event to the client. Consequently, the state is inconsistent between the client and the server, and the user experience is poor.

SUMMARY

Embodiments of the present disclosure provide a method, apparatus, and system for notifying an RTSP event so that the event state can be notified to the corresponding network device upon the change of the event state.

The objectives of the embodiments of the present disclosure are achieved through the following solutions.

A method for notifying an RTSP event in an embodiment of the present disclosure includes: monitoring an event state; and sending a notification indicative of a change of the event state to an event state receiving device if detecting the change of the event state.

A computer program provided in an embodiment of the present disclosure includes computer program codes. When being executed by a computer, the computer program codes enable the computer to perform any step of the method for notifying the RTSP event state.

A computer-readable storage medium provided in an embodiment of the present disclosure stores the computer program codes. When being executed by a computer, the computer program codes enable the computer to perform any step of the method for notifying the RTSP event state.

An apparatus for notifying an RTSP event in an embodiment of the present disclosure includes a hardware processor and a non-transitory storage medium. The apparatus is configured to perform operations comprising: monitor an event state; and send a notification indicative of a change of the event state when the event state monitoring unit detects the change of the event state.

A system for notifying an RTSP event in an embodiment of the present disclosure includes: an RTSP event notifying apparatus and an RTSP event notification receiving apparatus. The RTSP event notifying apparatus is configured to monitor an event state, and send a notification indicative of a change of the event state upon the change of the event state. The RTSP event notification receiving apparatus is configured to receive the notification.

The solutions under the embodiments of present disclosure monitors the event state, and notifies the change of the event state to the corresponding network entities, thus ensuring consistency of the event state between network entities and improving the user experience.

DETAILED DESCRIPTION OF THE EMBODIMENTS

To make the solutions, objectives and merits of the embodiments of present disclosure clearer, the following describes the embodiments of the present disclosure in detail with reference to accompanying drawings.

Figure 2:
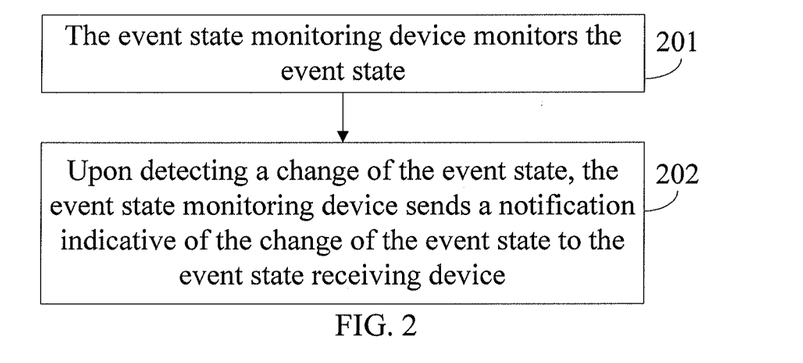
FIG. 2 is a flowchart of a method for notifying an RTSP event in the first embodiment of the present disclosure.

As shown in FIG. 2, a method for notifying an RTSP event in the first embodiment of the present disclosure includes:

Step 201: An event state monitoring device monitors the event state.

The event state monitoring device may be either a server or a client that sets up a media channel, otherwise, the event state monitoring device may be a third-party network device except the sever and the client.

The event state monitoring may be the monitoring on occurrence of a contingent event, for example, an exception of occurrence of a user operation or decoding failure, etc. The event state monitoring may also be the monitoring on the change of the state of a continuous event, for example, the state of playing streaming media, or a network state, such as the change from the play state to the fast-forward state. That is, the monitoring on the event state includes the monitoring on occurrence of a contingent event, or the monitoring on the change of the state of a continuous event.

In the RTSP process, after the client requests the server to execute a request command, if a normal or abnormal event occurs when the server executes the command, the server needs to notify the event or the latest condition of executing the request to the client, and therefore, the server needs to monitor the state of the event; likewise, after the server requests the client to execute a request command, if a normal or abnormal event occurs when the client executes the command, the client needs to notify the event or the latest condition of executing the request to the server, and therefore, the client needs to monitor the state of the event.

The event state may be monitored actively or passively. In the active monitoring, the event state to be monitored may be preset. It may be preset about which event will be monitored, or which network entities receives message of change on state event, etc. Events may also be monitored by default. For example, if the client requests to play streaming media, the server monitors the state of playing the streaming media naturally. In the passive monitoring, the monitoring is performed after a request for monitoring the event state is received from a network device. The device may be any network device except the device which monitors the event state.

Step 202: The event state monitoring device sends a notification indicative of the change of the event state to an event state receiving device if the change of the event state is detected.

The event state receiving device varies with the event state monitoring device. For example, if the event state monitoring device is a server, the event state receiving device is generally a client, but it is still possible that the event state receiving device is another network device.

Specifically, because prior RTSP is incapable of notifying an event, namely, incapable of sending a notification indicative of the change of the event state, so prior RTSP needs to be extended. The method for extending RTSP varies with the event type.

The notification indicative of the change of the event state varies with the monitored event state. If the monitoring aims to check whether an event occurs, the notification may include the information about occurrence of the event. If the monitoring aims to check whether the state of an event changes, the notification may include but is not limited to the information about the changed state of the event. The notification indicative of the change of the event state is intended to notify occurrence of a contingent event or the change of the state of a continuous event to the event state receiving device, for example, the change from the play state to the fast-forward state. When notifying the change of the state of a continuous event, the notification may include the state subsequent to the change, and the notification may also include the state prior to the change.

If the event state is monitored actively, the device that monitors the event state determines the entities for receiving the notification indicative of the change of the event state. If the event state is monitored passively, and the entities for receiving the notification indicative of the change of the event state are preset, the device that monitors the event state sends the notification to the preset entities; or if the entities for receiving the notification are not preset, the device that monitors the event state determines the entities for receiving the notification indicative of the change of the event state.

Evidently, the solutions under the embodiments of present disclosure monitors the event state, and notifies the change of the event state to the corresponding network entities, thus ensuring consistency of the event state between network entities and improving the user experience.

The event herein may be a contingent event compliant with preset conditions, the state of playing media streams, or the network state; the contingent event compliant with preset conditions is an event that occurs may lead to inconsistency between the event state of the event state monitoring device and the event state of the event state receiving device, for example, a user's operation information. The contingent events may be preset according to a specific situation.

Figure 3:
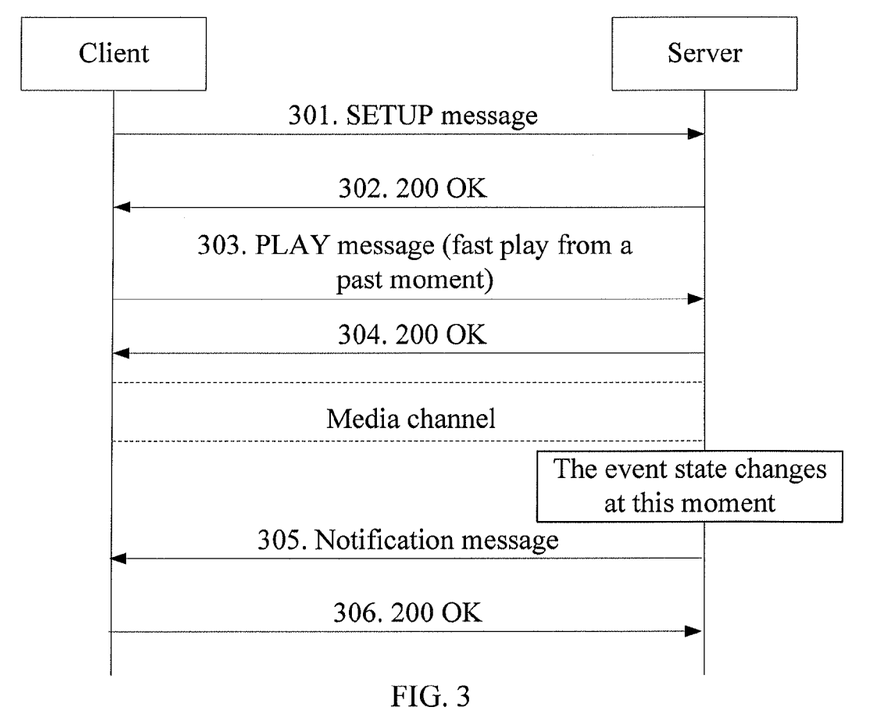
FIG. 3 is a signaling flowchart of a method for notifying an RTSP event in the second embodiment of the present disclosure.

As shown in FIG. 3, a method for notifying an RTSP event in the second embodiment of the present disclosure includes:

Step 301: A client sends a SETUP message to a server, requesting to set up a media stream.

Step 302: The server returns a success response (200 OK) to the client. The media stream is set up.

Step 303: The client sends a PLAY message to the server, requesting to fast play a media stream from a past moment.

Step 304: The server returns a success response (200 OK) to the client, and starts fast playing the media stream.

The media stream is transmitted through a media channel.

The server monitors the play state of the media stream. When the media stream plays at a certain point of time, the server is unable to continue the fast play. For example, if the server plays a live program, the server shifts to the normal play state. If the server plays a Video on Demand (VoD) program, when the fast play progress reaches the current live broadcast time, the play generally stops. The subsequent processing of the server depends on the program being played. For example, if the server plays a live program, when an event that changes the play state, occurs at a certain point of time, but the client is unaware that the play state has shifted to the normal play, the client goes on displaying the fast play state on the interface, thus leading to inconsistency of the play state between the server and the client. At this time, the server needs to send the latest play state to the client.

Step 305: The server sends a notification indicative of the change of the event state to the client. The notification may be an Event Notification message. In this way, the latest play state is notified to the client.

Prior RTSP does not provide relevant notification mechanism, and therefore, RTSP needs to be extended so that the server can send an event notification to the client. For the foregoing application scenario, a possible notification message is as follows:
NOTIFY rtsp://rtspclient.example.com RTSP/2.0
Content-Type: application/playback-status
Content-Length: . . .
Allow: play, pause
playback-speed: 1
playback-scale: 1
playback-range=now-
where "Allow: play, pause" means that the currently allowed operations are play and pause; "playback-speed: 1" and "playback-scale: 1" indicate play at the normal speed; and "playback-range=now-" means starting normal play from the current time.

Step 306: After receiving the event notification, the client returns a success response (200 OK) to the server.

In this embodiment, the server monitors the play state of the streaming media. When the play state changes, the server sends the latest play state to the client. Therefore, the play state keeps consistent between the client and the server, and the user experience is improved.

Figure 4:
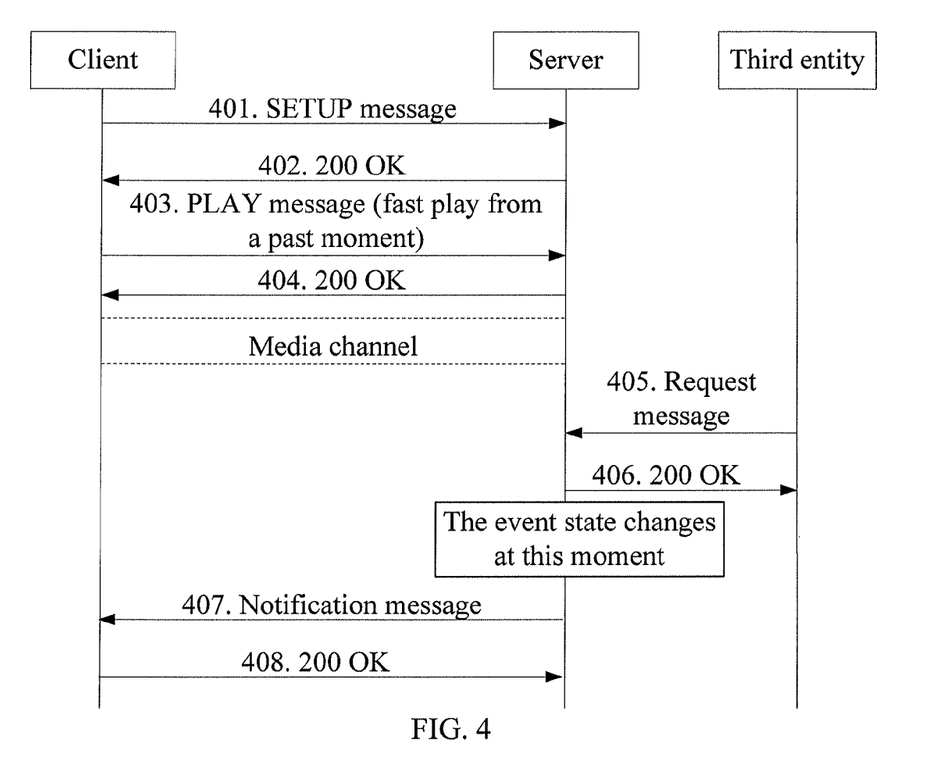
FIG. 4 is a signaling flowchart of a method for notifying an RTSP event in the third embodiment of the present disclosure.

As shown in FIG. 4, a method for notifying an RTSP event in the third embodiment of the present disclosure includes:

Step 401: A client sends a SETUP message to a server, requesting to set up a media stream.

Step 402: The server returns a success response (200 OK) to the client, and the media stream is set up.

Step 403: The client sends a PLAY message to the server, requesting to fast play a media stream from a past moment.

Step 404: The server returns a success response (200 OK) to the client, and starts fast playing the media stream.

The media channel is used for transmitting the media stream.

Step 405: A third device sends a request to the server, requesting to monitor the event state. Therefore, the server notifies the latest play state to the client upon the change of the play state.

The third device may be any device in the network, for example, a network management device, or a monitoring device that monitors the network. The third device may also be the client or the server.

Because prior RTSP does not provide a corresponding request message, so RTSP needs to be extended. An RTSP-based request message provided in an embodiment of the present disclosure is as follows:
EVENTREQ rtsp://rtspserver.example.com RTSP/2.0
Event: play-status
Event-Session: the-session-to-be-monitored
Notify-To: rtsp://rtspclient.example.com
Notify-Session: the-session-for-event-notification
Content-Length: 0

The fields in the message are described below:

Event: This field specifies the event that needs to be monitored. If the message does not include this field, the message receiver decides the events to be monitored or rejects the event request.

Event-Session: This field specifies the RTSP session in which the event will be monitored. If the message does not include the "Event-Session" header field, by default, the event in the session corresponding to the request needs to be monitored, or the message receiver decides the sessions that need to be monitored. For example, when the "EVENTREQ" field includes a "Session" header field, the session that involves the EVENTREQ message itself is to be monitored, or all sessions are to be monitored.

Notify-To: This field indicates the device to which the event is to be notified. If the message does not include this header field, the message receiver may reject the request or decide the device for receiving the notification according to the preset local policy or stored configuration file. For example, the event notification is sent to the sender of the EVENTREQ message, or the event notification is sent to the peer device of the session specified by the "Notify-Session" field.

Notify-Session: This field specifies the session in which the event notification is to be sent. If the message does not include this header field, the message receiver decides the session in which or outside which the event notification is to be sent.

If the server does not receive one of the four fields above, the server may generate a default request message for monitoring the event state according to the local configuration information. For example, if the media play is requested through a PLAY message, reporting the play state is a natural requirement. Therefore, when the server gets that the client is able to receive notification messages, even if the server does not receive a request message, it is deemed by default that the client has requested monitoring some basic events such as the play state event.

Step 406: After receiving the request message, the server returns a success response (200 OK) to the third device.

When the fast play progress reaches a certain point of time, the server is unable to continue the fast play, and detects the change of the play state.

Step 407: The server sends a notification to the client to notify the client about the change of the play state and the latest play state.

Step 408: The client returns a success response (200 OK) to the server.

In this embodiment, after an RTSP session is set up between the client and the server, the third device requests the server to monitor the play state. Therefore, when the server detects the change of the play state, the server sends a notification indicative of the change of the play state to the client, thus keeping the play state consistent between the server and the client and enhancing the user experience; further, the third device requests monitoring of the play state, thus improving the network flexibility.

In practice, after receiving the latest play state, the client change the displaying play state to the latest play state sent by the server. Therefore, the state displayed by the client is consistent with the actual play state, and the user experience is improved.

Figure 5:
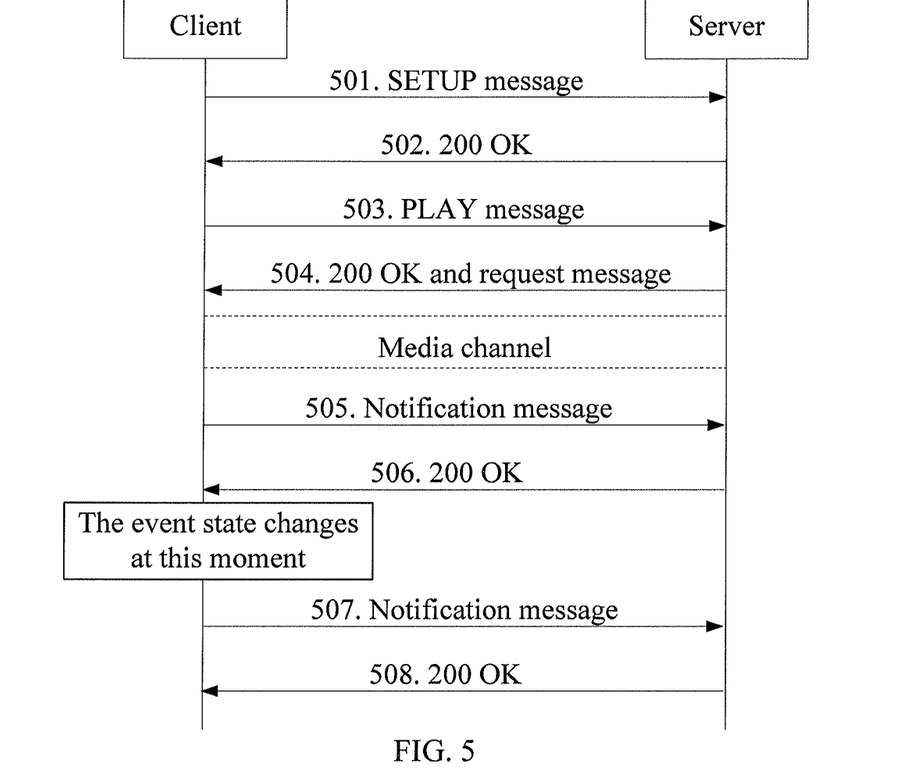
FIG. 5 is a signaling flowchart of a method for notifying an RTSP event in the fourth embodiment of the present disclosure.

As shown in FIG. 5, a method for notifying an RTSP event in the fourth embodiment of the present disclosure includes:

Step 501: A client sends a SETUP message to a server, requesting to set up a media stream.

Step 502: The server returns a success response (200 OK) to the client. The media stream is set up.

Step 503: The client sends a PLAY message to the server, requesting to play a media stream.

Step 504: The server returns a success response (200 OK) to the client, and starts fast playing the media stream. The success response (200 OK) includes a request message, requesting to monitor the user operation.

The media channel is used for transmitting the media stream.

Step 505: After receiving the request message, the client sends a notification to the server to notify the server about the current operation of the user.

Step 506: After receiving the information about the current operation of the user, the server returns a success response (200 OK) to the client.

The client monitors the user operation. The client can detect the change when the user operation changes at a certain point of time.

Step 507: Upon detecting the change of the user operation, the client sends a notification to the server to notify the server the information about the changed user operation.

Step 508: After receiving the information about the changed user operation, the server returns a success response (200 OK) to the client.

In this embodiment, the request message is included in the success response (200 OK); but in practice, the request message may be a separate request message, or included in another message exchanged between the server and the client. In this embodiment, the server adds the request message to a message exchanged in the prior art to request the client to monitor the user operation. Therefore, upon the change of the user operation, the client sends the information about the changed user operation to the server, and the event state keeps consistent between the server and the client.

In practice, after receiving the information about the changed user operation, the server performs operations according to the user operation. For example, if the user operation is fast play of the streaming media, the server changes the play state of the streaming media to fast play after receiving the information about the changed user operation; if the user operation is pause, the server suspends the play of the streaming media, and specifically, the sending of the streaming data is suspended.

Figure 6:
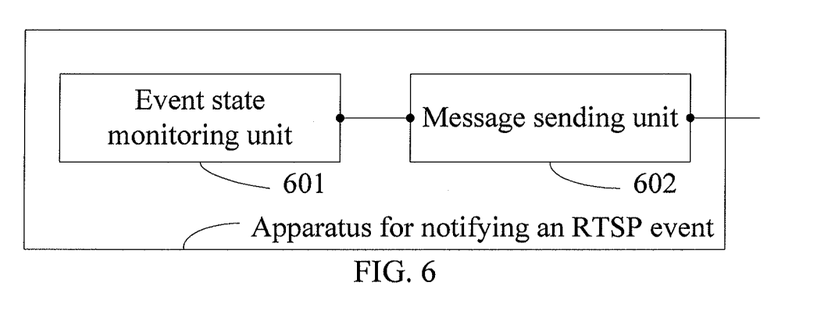
FIG. 6 shows a structure of an apparatus for notifying an RTSP event in the first embodiment of the present disclosure.

Corresponding to the RTSP event notification method, an apparatus for notifying an RTSP event is provided in the first embodiment of the present disclosure. As shown in FIG. 6, the apparatus includes:
an event state monitoring unit 601, adapted to monitor the event state; and
a message sending unit 602, adapted to send a notification indicative of the event state change when the event state monitoring unit 602 detects the change of the event state.

Evidently, the solutions under the embodiment of present disclosure monitors the event state, and notifies the information about the change of the event state to the corresponding network entities, thus ensuring consistency of the event state between network entities and improving the user experience.

Figure 7:
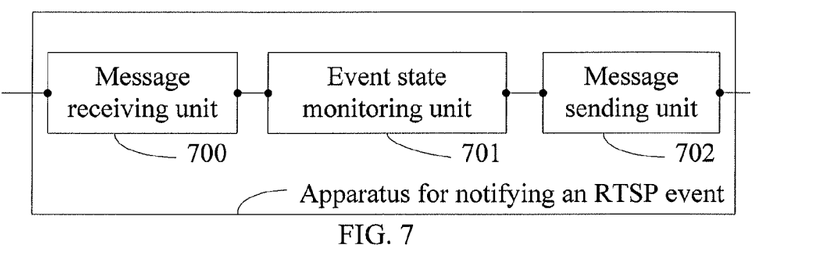
FIG. 7 shows a structure of an apparatus for notifying an RTSP event in the second embodiment of the present disclosure.

An apparatus for notifying an RTSP event is provided in the second embodiment of the present disclosure. Compared with the apparatus in the first embodiment, the apparatus for notifying an RTSP event in the second embodiment further includes a message receiving unit 700. As shown in FIG. 7, the apparatus in the second embodiment includes:
a message receiving unit 700, adapted to receive a request message which requests to monitor the event state;
an event state monitoring unit 701, adapted to monitor the event state after the message receiving unit 700 receives the request message; and
a message sending unit 702, adapted to send a notification indicative of a change of the event state when the event state monitoring unit 701 detects the change of the event state.

In this embodiment, the apparatus for notifying the RTSP event monitors the event state after receiving the request message, and sends information about the change of the event state when the event state changes. Therefore, the event state keeps consistent between the server and the client, and the user satisfaction is improved.

In practice, if the state of an event that has occurred at the time of monitoring the event state needs to be monitored, the message sending unit is further adapted to send information about the current state of the event after the message receiving unit receives the request message to keep the event state consistent between the client and the server, because the event state is already inconsistent between the client and the server at the time of sending the request message.

Figure 8:
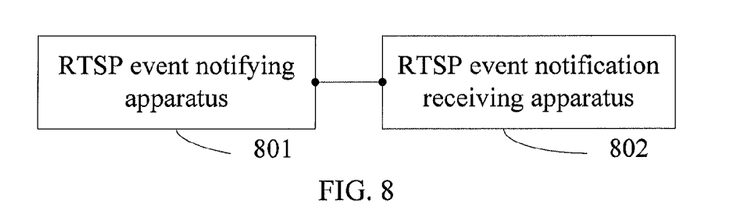
FIG. 8 shows a structure of a system for notifying an RTSP event in the first embodiment of the present disclosure.

A system for notifying an RTSP event is provided in the first embodiment of the present disclosure. As shown in FIG. 8, the system includes:
an RTSP event notifying apparatus 801, adapted to monitor an event state, and send a notification indicative of a change of the event state upon the change of the event state, where the RTSP event notifying apparatus may be a server or a client in practice; and
an RTSP event notification receiving apparatus 802, adapted to receive the notification.

Generally, if the RTSP event notifying apparatus 801 is a server, the RTSP event notification receiving apparatus 802 is a client; if the RTSP event notifying apparatus 801 is a client, the RTSP event notification receiving apparatus 802 is a server. Nevertheless, it is also possible that both the RTSP event notifying apparatus 801 and the RTSP event notification receiving apparatus 802 are servers, or both the RTSP event notifying apparatus 801 and the RTSP event notification receiving apparatus 802 are clients.

Evidently, the solutions under the embodiments of present disclosure monitors the event state, and notifies the information about the change of the event state to the corresponding network entities, thus ensuring consistency of the event state between network entities and improving the user experience.

Figure 9:
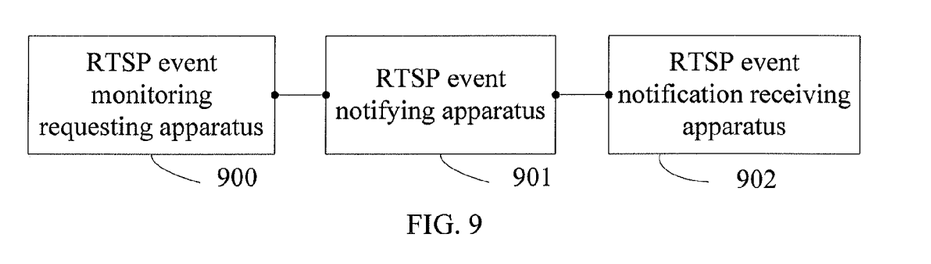
FIG. 9 shows a structure of a system for notifying an RTSP event in the second embodiment of the present disclosure.

As shown in FIG. 9, a system for notifying an RTSP event in the second embodiment of the present disclosure includes:

an RTSP event monitoring requesting apparatus 900, adapted to send a request message which requests to monitor the event state;

an RTSP event notifying apparatus 901, adapted to monitor the event state after receiving the request message, and send a notification indicative of a change of the event state upon the change of the event state; and an RTSP event notification receiving apparatus 902, adapted to receive the notification.

In practice, the RTSP event monitoring requesting apparatus and the RTSP event notifying apparatus are the same network device, or different network entities.

In this embodiment, after an RTSP session is set up between the RTSP event notifying apparatus and the RTSP event notification receiving apparatus, the RTSP event monitoring requesting apparatus sends a request message to the RTSP event notifying apparatus, requesting to monitor the event state. Therefore, upon detecting the change of the event state, the RTSP event notifying apparatus notifies the change of the event state to the RTSP event notification receiving apparatus. As a result, the event state keeps consistent between the RTSP event notifying apparatus and the RTSP event notification receiving apparatus, and the user experience is improved. Further, the RTSP event monitoring requesting apparatus sends a request message which requests to monitor the play state, thus improving the network flexibility.

Those skilled in the art are aware that all or part of the steps of the foregoing embodiments may be implemented by hardware instructed by a program. The program may be stored in a computer-readable storage medium. When being executed, the program performs the following steps:

1. The event state monitoring device monitors the event state.

2. Upon detecting a change of the event state, the event state monitoring device sends a notification indicative of the change of the event state to the event state receiving device.

The storage medium may be a Read-Only Memory (ROM), a magnetic disk or a Compact Disk (CD).

Detailed above are a method, apparatus, and system for notifying an RTSP event under the present disclosure. Although the disclosure is described through several exemplary embodiments, the disclosure is not limited to such embodiments. It is apparent that those skilled in the art can make modifications and variations to the disclosure without departing from the spirit and scope of the disclosure. The disclosure is intended to cover the modifications and variations provided that they fall in the scope of protection defined by the following claims or their equivalents.

What is claimed is:

1. A method for notifying a Real-Time Streaming Protocol (RTSP) event, comprising:
    monitoring, by an RTSP event monitoring and notifying device, an RTSP event state for an RTSP event, the RTSP event comprises at least transmission of real-time audio or video data streaming on demand; and
    sending, by the RTSP event monitoring and notifying device to an RTSP event state receiving device, a notification indicative of a change of the RTSP event state upon detecting the change of the RTSP event state, so as to enable the RTSP event state receiving device to update its RTSP event state to be consistent with the RTSP event monitoring and notifying device,
    wherein if the RTSP event occurs at time of monitoring the RTSP event state, the notification carries the information about the occurrence of the RTSP event;
    wherein if the RTSP event occurs before start of monitoring the RTSP event state and the RTSP event state has changed, the notification carries the information about the changed state of the RTSP event; and
    wherein the RTSP event comprises one of a state of playing streaming media and a network state.

2. The method according to claim 1, wherein:
    monitoring is performed after receiving, by the RTSP event monitoring and notifying device, a request message which requests monitoring the RTSP event state.

3. The method according to claim 2, wherein before sending, by the RTSP event monitoring and notifying device the notification to the RTSP event state receiving device, the method further comprises:
    determining, by the RTSP event monitoring and notifying device, whether the request message includes information about the RTSP event state receiving device; and
    if the request message includes the information about the RTSP event state receiving device, sending, by the RTSP event monitoring and notifying device, the notification to the RTSP event state receiving device according to the information; or
    if the request message does not include the information about the RTSP event state receiving device, sending, by the RTSP event monitoring and notifying device, the notification to the RTSP event state receiving device according to one of a preset local policy and a stored configuration file.

4. The method according to claim 2, wherein after receiving, by the RTSP event monitoring and notifying device, the request message, the method further comprises:
    sending, by the RTSP event monitoring and notifying device, information about a current state of the RTSP event to the RTSP event state receiving device.

5. The method of claim 2, wherein:
    the notification and the request message are RTSP-based messages.

6. The method according to claim 1, wherein the monitoring, by RTSP event monitoring and notifying device, the RTSP event state comprises:
    monitoring, by the RTSP event monitoring and notifying device, the RTSP event state according to one of a preset local policy and a stored configuration file.

7. The method of claim 1, wherein:
    after receiving the notification that includes the information about the occurrence of the RTSP event, the RTSP event state receiving device performs operations according to one of a preset local policy and a stored configuration file.

8. The method according to claim 1, wherein:
    after receiving the notification that includes the information about the changed state of the RTSP event, the RTSP event state receiving device updates the corresponding RTSP event state to the changed state.

9. The method according to claim 1, wherein the monitoring the RTSP event state comprises:
    monitoring, by RTSP event monitoring and notifying device, occurrence of a contingent event.

10. The method according to claim 1, wherein the monitoring, by RTSP event monitoring and notifying device, the RTSP event state comprises:
    monitoring, by RTSP event monitoring and notifying device, a change of a state of a continuous event.

11. The method according to claim 10, wherein:
the notification is adapted to notify the changed state of the continuous event to the RTSP event state receiving device.

12. The method according to claim 1, wherein RTSP event monitoring and notifying device is an RTSP client, and the RTSP event state receiving device is an RTSP server.

13. The method according to claim 1, wherein the RTSP event monitoring and notifying device is an RTSP server, and the RTSP event state receiving device is an RTSP client.

14. An apparatus for notifying a Real-Time Streaming Protocol (RTSP) event, comprises a hardware processor and a non-transitory storage medium, the apparatus is configured to perform operations comprising:
monitor an RTSP event state for an RTSP event, wherein the RTSP event comprises at least transmission of real-time audio or video data streaming on demand; and
send a notification indicative of a change of the RTSP event state to an RTSP event state receiving device, when the RTSP event state monitoring unit detects that there is a change of the RTSP event state, so as to enable the RTSP event state receiving device to update its RTSP event state to be consistent with the apparatus,
wherein if the RTSP event occurs at time of monitoring the RTSP event state, the notification carries the information about the occurrence of the RTSP event, and
if the RTSP event occurs before start of monitoring the RTSP event state and the RTSP event state has changed, the notification carries the information about the changed state of the RTSP event;
wherein the RTSP event comprises one of a state of playing streaming media and a network state.

15. The apparatus according to claim 14, further configured to perform operations comprising:
receive a request message which requests to monitor the RTSP event state; and
monitor the RTSP event state after the message receiving unit receives the request message.

16. The apparatus according to claim 14, further configured to perform operations comprising:
send information about a current state of the RTSP event after receiving the request message.

17. A system for notifying a Real-Time Streaming Protocol (RTSP) event, comprising:
an RTSP event notifying apparatus, configured to monitor an RTSP event state for an RTSP event which comprises at least transmission of real-time audio or video data streaming on demand, and send a notification indicative of a change of the RTSP event state to an RTSP event notification receiving apparatus upon detecting the change of the RTSP event state; and
the RTSP event notification receiving apparatus, configured to receive the notification, and update its RTSP event state to be consistent with the RTSP event notifying apparatus,
wherein if the RTSP event occurs at time of monitoring the RTSP event state, the notification carries the information about the occurrence of the RTSP event;
wherein if the RTSP event occurs before start of monitoring the RTSP event state and the RTSP event state has changed, the notification carries the information about the changed state of the RTSP event; and
wherein the RTSP event comprises one of a state of playing streaming media and a network state.

18. The system according to claim 17, further comprising an RTSP event monitoring requesting apparatus, wherein:
the RTSP event monitoring requesting apparatus is configured to send a request message which requests to monitor the RTSP event state to the RTSP event notifying apparatus; and
the RTSP event notifying apparatus is further configured to monitor the RTSP event state after receiving the request message.

* * * * *